(12) United States Patent
Kato et al.

(10) Patent No.: US 9,339,988 B2
(45) Date of Patent: May 17, 2016

(54) JOINED BODY

(71) Applicant: Teijin Limited, Osaka-shi, Osaka (JP)

(72) Inventors: Takumi Kato, Matsuyama (JP); Kiyoshi Saito, Matsuyama (JP)

(73) Assignee: Teijin Limited, Osaka-shi, Osaka (JP)

( * ) Notice: Subject to any disclaimer, the term of this patent is extended or adjusted under 35 U.S.C. 154(b) by 177 days.

(21) Appl. No.: 14/088,656

(22) Filed: Nov. 25, 2013

(65) Prior Publication Data

US 2014/0079908 A1    Mar. 20, 2014

Related U.S. Application Data

(63) Continuation of application No. PCT/JP2012/064013, filed on May 24, 2012.

(30) Foreign Application Priority Data

May 25, 2011    (JP) ................ 2011-117259

(51) Int. Cl.
*B32B 3/08* (2006.01)
*B32B 3/30* (2006.01)
(Continued)

(52) U.S. Cl.
CPC . *B32B 7/04* (2013.01); *B29C 65/02* (2013.01); *B29C 65/08* (2013.01); *B29C 66/112* (2013.01); *B29C 66/131* (2013.01); *B29C 66/21* (2013.01); *B29C 66/304* (2013.01); *B29C 66/30221* (2013.01); *B29C 66/524* (2013.01); *B29C 66/5346* (2013.01); *B29C 66/7212* (2013.01); *B29C 66/72143* (2013.01); *B29C 66/7392* (2013.01); *B29C 66/73921* (2013.01); *B32B 3/06* (2013.01); *B29C 65/06* (2013.01); *B29C 65/1412* (2013.01); *B29C 65/16* (2013.01);
(Continued)

(58) Field of Classification Search
None
See application file for complete search history.

(56) References Cited

U.S. PATENT DOCUMENTS 4,265,981 A * 5/1981 Campbell ........... B28B 23/0006
                                                    156/172
4,278,726 A * 7/1981 Wieme ................... A63C 5/075
                                                    188/382
(Continued)

FOREIGN PATENT DOCUMENTS

DE    1214193 B * 4/1966 ............... D01D 5/20
JP    H04-201422 A    7/1992
(Continued)

OTHER PUBLICATIONS

International Search Report issued in corresponding International Application No. PCT/JP2012/064013 mailed Aug. 7, 2012.
(Continued)

*Primary Examiner* — Jeff Vonch
(74) *Attorney, Agent, or Firm* — Banner & Witcoff, Ltd.

(57) ABSTRACT

A composite shaped product of the present invention is a joined body which is excellent in shock resistance, and which includes shaped products (B1) and (B2) which contain a carbon fiber and a thermoplastic resin, in which the shaped products (B1) and (B2) are disposed on both sides of a composite substrate (A) that contains a continuous fiber such as a polyester fiber and a thermoplastic resin so that the composite substrate (A) is interposed between the shaped products (B1) and (B2), and the shaped products (B1) and (B2) are heat-welded to each other at a joining portion (C) through a through hole (D1) of the composite substrate (A).

11 Claims, 4 Drawing Sheets

(51) Int. Cl.

| | |
|---|---|
| *B32B 5/02* | (2006.01) |
| *B32B 5/26* | (2006.01) |
| *B32B 5/28* | (2006.01) |
| *B32B 7/04* | (2006.01) |
| *B32B 27/02* | (2006.01) |
| *B32B 27/04* | (2006.01) |
| *B32B 27/06* | (2006.01) |
| *B32B 27/12* | (2006.01) |
| *B32B 3/06* | (2006.01) |
| *B29C 65/08* | (2006.01) |
| *B29C 65/02* | (2006.01) |
| *B32B 37/16* | (2006.01) |
| *B32B 3/26* | (2006.01) |
| *B32B 37/14* | (2006.01) |
| *B32B 37/18* | (2006.01) |
| *B32B 37/00* | (2006.01) |
| *B29C 65/34* | (2006.01) |
| *B29C 65/14* | (2006.01) |
| *B29C 65/16* | (2006.01) |
| *B29C 65/20* | (2006.01) |
| *B29C 65/48* | (2006.01) |
| *B29C 65/82* | (2006.01) |
| *B29C 65/00* | (2006.01) |
| *B29L 31/00* | (2006.01) |
| *B29C 65/06* | (2006.01) |
| *B29C 65/36* | (2006.01) |
| *B29L 31/30* | (2006.01) |

(52) U.S. Cl.
CPC .............. *B29C65/20* (2013.01); *B29C 65/3416* (2013.01); *B29C 65/3492* (2013.01); *B29C 65/3616* (2013.01); *B29C 65/3684* (2013.01); *B29C 65/48* (2013.01); *B29C 65/8238* (2013.01); *B29C 66/0246* (2013.01); *B29C 66/02242* (2013.01); *B29C 66/71* (2013.01); *B29C 66/7254* (2013.01); *B29C 66/72141* (2013.01); *B29C 66/7315* (2013.01); *B29C 66/8322* (2013.01); *B29K 2995/0089* (2013.01); *B29L 2031/003* (2013.01); *B29L 2031/30* (2013.01); *B29L 2031/3055* (2013.01); *B32B 3/266* (2013.01); *B32B 5/26* (2013.01); *B32B 5/28* (2013.01); *B32B 27/02* (2013.01); *B32B 27/04* (2013.01); *B32B 27/06* (2013.01); *B32B 27/12* (2013.01); *B32B 37/00* (2013.01); *B32B 37/142* (2013.01); *B32B 37/185* (2013.01); *B32B 2250/03* (2013.01); *B32B 2250/20* (2013.01); *B32B 2260/021* (2013.01); *B32B 2260/046* (2013.01); *B32B 2262/02* (2013.01); *B32B 2262/0261* (2013.01); *B32B 2262/0276* (2013.01); *B32B 2262/106* (2013.01); *B32B 2262/12* (2013.01); *B32B 2305/08* (2013.01); *B32B 2305/10* (2013.01); *B32B 2605/08* (2013.01); *Y10T 428/24174* (2015.01); *Y10T 428/24322* (2015.01); *Y10T 428/24331* (2015.01); *Y10T 428/24339* (2015.01); *Y10T 428/24347* (2015.01); *Y10T 428/24612* (2015.01); *Y10T 428/24752* (2015.01); *Y10T 428/24995* (2015.04); *Y10T 428/249922* (2015.04); *Y10T 428/249938* (2015.04); *Y10T 428/249945* (2015.04); *Y10T 428/249947* (2015.04); *Y10T 428/249958* (2015.04); *Y10T 428/249962* (2015.04); *Y10T 428/249964* (2015.04); *Y10T 428/249981* (2015.04); *Y10T 428/249992* (2015.04)

(56) References Cited

U.S. PATENT DOCUMENTS

| | | | | |
|---|---|---|---|---|
| 4,460,633 | A * | 7/1984 | Kobayashi | D04H 3/04 428/105 |
| 4,791,765 | A * | 12/1988 | Noggle | B32B 3/00 219/86.1 |
| 4,816,326 | A * | 3/1989 | Jones | B29C 61/0633 156/272.2 |
| 5,242,743 | A * | 9/1993 | Nakanishi | B29C 70/16 156/138 |
| 5,637,375 | A * | 6/1997 | Hohman | B29C 70/081 428/113 |
| 6,811,861 | B2 * | 11/2004 | Bank | E04C 5/07 428/107 |
| 7,497,507 | B2 | 3/2009 | Matsushima et al. | |
| 8,277,933 | B1 * | 10/2012 | Vaidya | B29C 70/46 428/292.1 |
| 2001/0050032 | A1 * | 12/2001 | Dry | C04B 22/006 106/677 |
| 2002/0106490 | A1 * | 8/2002 | Wagenblast | B29C 65/64 428/180 |
| 2004/0197534 | A1 * | 10/2004 | Miller | B32B 3/266 428/195.1 |
| 2007/0257518 | A1 | 11/2007 | Matsushima et al. | |
| 2008/0050571 | A1 * | 2/2008 | Haque | B32B 5/06 428/219 |
| 2009/0056882 | A1 | 3/2009 | Sano et al. | |
| 2009/0278371 | A1 * | 11/2009 | Fuchs et al. | 296/29 |
| 2010/0068518 | A1 * | 3/2010 | Honma et al. | 428/401 |
| 2010/0075144 | A1 * | 3/2010 | Davies | C08J 5/04 428/375 |
| 2010/0178495 | A1 * | 7/2010 | Taketa et al. | 428/339 |
| 2012/0034833 | A1 * | 2/2012 | Schaube | A63C 11/227 442/172 |
| 2012/0231252 | A1 * | 9/2012 | Arakawa et al. | 428/219 |
| 2012/0321840 | A1 * | 12/2012 | Wu | G06F 1/1633 428/116 |
| 2013/0130584 | A1 * | 5/2013 | Fujiwara et al. | 442/392 |

FOREIGN PATENT DOCUMENTS

| | | |
|---|---|---|
| JP | H06-91816 A | 4/1994 |
| JP | H06-126847 A | 5/1994 |
| JP | 2009-220478 A | 10/2009 |
| WO | WO 0143934 A1 * | 6/2001 .............. D02G 3/40 |
| WO | 2005054018 A1 | 6/2005 |
| WO | 2006/025316 A1 | 3/2006 |
| WO | WO 2009013589 A2 * | 1/2009 .............. A42B 3/06 |

OTHER PUBLICATIONS

Written Opinion issued in corresponding International Application No. PCT/JP2012/064013 mailed Aug. 7, 2012.

Sep. 16, 2014—(EP) Supplementary Search Report—App 12790380.5.

* cited by examiner

JOINED BODY

This application is a continuation of International Application No. PCT/JP2012/064013 filed on May 24, 2012, and claims priority from Japanese Patent Application No. 2011-117259, filed on May 25, 2011, the entire disclosure of which are incorporated herein by reference.

TECHNICAL FIELD

The present invention relates to a joined body including a composite substrate that contains an organic fiber and two shaped products that contain carbon fibers. In particular, the present invention relates to a joined body suitable for application to a vehicle which requires a shock resistance, in which a composite substrate that contains multifilaments is interposed between two shaped products that contain carbon fibers.

BACKGROUND

Plastics may be processed by various molding methods and are essential materials in our lives. In particular, among the plastics, thermoplastic resins are excellent in flexibility and are widely used. On the other hand, the strength or rigidity of a thermoplastic resin is not necessarily sufficient in some cases. For example, in an application that requires high strength and high rigidity, a thermoplastic resin is reinforced by incorporating, into the thermoplastic resin, a short fiber of an inorganic fiber such as a glass fiber or a carbon fiber. Patent Document 1 discloses an organic fiber-reinforced composite material constituted by an ultrahigh molecular weight polyethylene fiber and a methacrylate-based vinylester resin for the purpose of improving the shock absorptivity and rigidity.

Patent Document 2 discloses an automobile bonnet which includes an outer part made of an FRP and an inner part joined to the rear side of the outer part. It is described that performances related to pedestrian protection are enhanced by such an FRP automobile bonnet.

Patent Document 3 discloses a composite body of a sandwich structure in which a fiber-reinforced material constituted by a continuous fiber and a matrix resin is provided on both of a core material. The core material is formed with a through hole in the thickness direction and the fiber-reinforced materials are joined to each other by the matrix resin at the through hole. It is described that the composite body with such a sandwich structure is suitable for a housing of an electric or electronic device such as a portable information terminal since it is thin, light and highly rigid. However, it is doubtful whether a shock resistance required for application to a vehicle is provided.

(Patent Document 1) JP-A-6-126847
(Patent Document 2) WO 2006/025316
(Patent Document 3) JP-A-2009-220478

DISCLOSURE OF THE INVENTION

A main object of the present invention is to provide a novel joined body constituted by an organic fiber-reinforced composite material (OFRP) and a carbon fiber composite material (CFRP).

Another object of the present invention is to provide a joined body which is excellent in shock resistance.

Still another object of the present invention is to provide a joined body that prevents a joining portion from being peeled off and that is useful as a vehicle member, in particular, as a structure member for an automobile.

Other objects and advantages of the present invention may become evident from the following descriptions.

According to the present invention, the objects and advantages of the present invention may be achieved by a joined body including a joining portion (C) constituted by a shaped product (B1), a composite substrate (A), and a shaped product (B2) which are laminated in this order, in which the composite substrate (A) contains a multifilament of an organic material and a thermoplastic, and the shaped products (B1) and (B2) each contain a carbon fiber and a resin, and (i) the composite substrate (A) includes an impregnation portion in which a space between the multifilaments is impregnated with the thermoplastic resin and a non-impregnation portion in which the inside of the multifilament is not impregnated with the thermoplastic resin, (ii) the composite substrate (A) has a penetration portion (D) which penetrates the composite substrate (A) in a thickness direction, and (iii) the shaped products (B1) and (B2) are contacted with and fixed through the penetration portion (D) of the composite substrate (A).

The inventors of the present invention have paid attention to an organic fiber-reinforced composite material (OFRP) as a material for improving shock resistance. For example, it has been generally known that a sandwich structure fabricated by: using an organic fiber-reinforced composite material as a core material in Patent Document 1 exemplified above; sandwiching the core material by carbon fiber composite materials (CFRP) on top and bottom sides of the core material; and using a conventional adhesive on the contact surfaces, exhibits a certain degree of shock resistance. The inventors have researched higher shock resistance as a structural member for a vehicle using an organic fiber-reinforced composite material. Then, the inventors have found that a method of joining carbon fiber composite materials which are provided on both sides of the core material and the internal structure of the organic fiber-reinforced composite material are important, thereby completing the present invention.

PREFERRED EMBODIMENTS OF THE INVENTION

Figure 1:
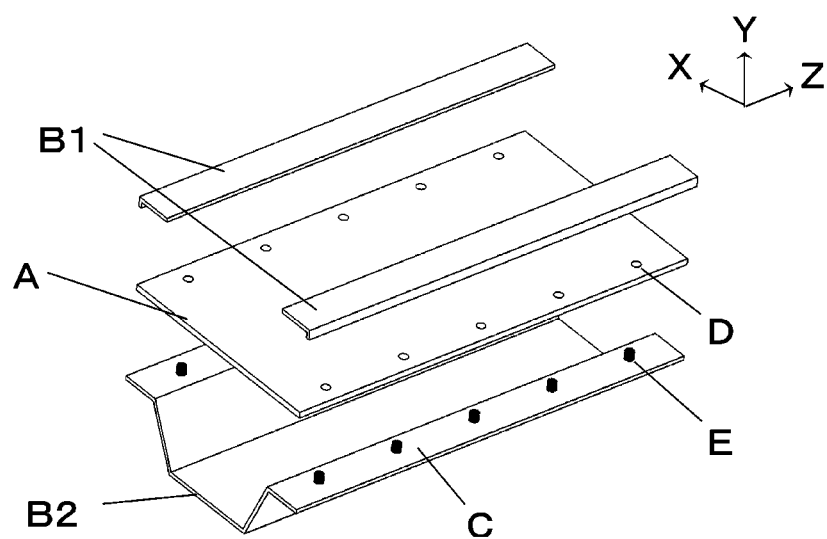
FIG. 1 is an example (exploded view) of a joined body in which shaped products (B1) and a shaped product (B2) are disposed on both sides of a composite substrate (A) having a penetration portion (D).

Hereinafter, exemplary embodiments will be described.
[Composite Substrate (A)]

A composite substrate (A) in the present invention includes: a plurality of (two or more) multifilaments containing an organic material; and a thermoplastic resin.

The multifilaments exist substantially in a state of plural fiber bundles in the composite substrate (A). A multifilament may be either a continuous fiber or a cut short fiber, but the continuous fiber having a continuous length are preferable. As a form of the multifilament, a twisted fiber cord or a woven fabric or knit constituted by the twisted fiber cord are preferable. Since the fiber bundles are tightened due to twisting, impregnation of the resin into the inside of the fiber bundles is suppressed. The number of twists is preferably 30 to 700 times per 1 m. It is preferable that a space between multifilaments (sometimes, referred to as "a space between fiber bundles) is substantially impregnated with a thermoplastic resin. Also, it is preferable that the inside of a multifilament (sometimes, referred to as "the inside of a fiber bundle") is not substantially impregnated with the thermoplastic resin. As for the multifilament, a fiber of a discontinuous length may be used in combination with the continuous fiber.

The composite substrate (A) in the present invention is characterized by including an impregnation portion where the above multifilaments are impregnated with the thermoplastic resin and a non-impregnation portion where an impregnation degree is low. The composite substrate (A) including the multifilaments is substantially constituted by the impregnation portion and the non-impregnation portion. Here, in the impregnation portion, most of or substantially 100% of the space between fiber bundles includes a thermoplastic resin. In the non-impregnation portion, the thermoplastic resin does not infiltrate into the inside of a fiber bundle, and not more than 50% of the fiber bundles at most may include the thermoplastic resin, and it is preferable that the fiber bundles substantially may not include the thermoplastic resin.

When the non-impregnation portion where the inside of the fiber bundle is not substantially impregnated with the thermoplastic resin exists in the composite substrate (A) as described above, the composite substrate (A) and the joined body to be finally obtained is excellent in shock resistance. Although the detailed reason for this is not clear, it is thought as follows. The portion (non-impregnation portion) having a low impregnation rate of the thermoplastic resin in the composite substrate (A) is not in a state in which the multifilament are completely restrained by the thermoplastic resin but has a certain degree of freedom. It is speculated that the multifilament with this degree of freedom contribute to shock resistance. When a thermoplastic resin is used as a resin for improving a degree of freedom of the multifilament, the impregnation level of the resin to the inside of the fiber bundle may be adjusted. When a thermosetting resin is used as the resin, it is difficult to control the impregnation rate because the thermosetting resin has a relatively low viscosity as compared with the thermoplastic resin.

By using the composite substrate (A) in which the resin impregnation rate in the space between the fiber bundles is high and the resin impregnation rate in the inside of the fiber bundle is low as described above, the joined body of the present invention exhibits a good physical property.

It is preferable that the resin impregnation rate in the space between the fiber bundles is 90% or more. When the space between the fiber bundles are sufficiently filled with the resin, no void remains in the space between the fiber bundles and thus the strength of the composite substrate (A) is increased. The upper limit of the impregnation rate is 100%. In addition, the impregnation rate in the space between the fiber bundles does not have to be a constant value and may have a distribution within a range of 90% to 100%. When the space between the fiber bundles are not sufficiently filled with the resin, a void remain in the space between the fiber bundles and thus the strength of the composite substrate (A) may be deteriorated.

When considering shock resistance, the inside of the fiber bundle may effectively absorb impact energy because the multifilament have a certain degree of freedom in the composite substrate (A) as described above. Accordingly, it is preferably that the resin impregnation rate into the inside of the fiber bundle is low. It is preferable that the resin impregnation rate into the inside of the fiber bundle is 50% or less, and it is more preferable that the inside of the fiber bundle is not substantially impregnated with the resin. That is, the lower limit of the impregnation rate is substantially 0%. Further, the impregnation rate into the inside of the fiber bundle does not have to be a constant value and may have a distribution within a range of 0% to 50%.

When the impregnation rates of the thermoplastic resin into the space between the fiber bundles of the multifilaments and into the inside of the fiber bundle are set to the above-described ranges, single fibers that form a multifilament may have a freedom of deformation or movement. Therefore, the composite substrate (A) may adsorb a received shock and as a result, a joined body that is excellent in shock resistance is provided.

The degree of infiltration of the resin to the inside of the fiber bundles may be controlled by, for example, selecting the kinds of thermoplastic resins or by the molding pressure or the temperature of the thermoplastic resin in a process of impregnating the space between the fiber bundles with the resin as described later, in addition to the configuration of the twisted fibers, the woven fabric or the knit as described above.

The resin impregnation rate may be confirmed by a microscopy observation using, for example, an electron microscope or an optical microscope. The resin impregnation rate may be calculated based on an area of voids in a cross section of the composite substrate (A). Further, the resin impregnation rate in the space between the fiber bundles may be calculated based on how many single fibers forming multifilaments taken out from the composite substrate (A) can be taken out.

As for a multifilament containing an organic material contained in the composite substrate (A), there is no special limitation. However, for example, polyetheretherketone fibers, polyphenylene sulfide fibers, polyether sulfone fibers, aramid fibers, polybenzoxazole fibers, polyarylate fibers, polyketone fibers, polyester fibers, polyamide fibers, polyvinyl alcohol fibers, and high-strength polyethylene fibers are exemplified.

Since such a multifilament have a function as a reinforcing material, it is preferable to use a multifilament that have a heat resistance not lower than the temperature which enables molding of the thermoplastic resin which is the matrix resin included in the composite substrate (A). Polyester fibers, polyamide fibers, and polyvinyl alcohol fibers are preferable among others because physical properties such as a mechanical property and heat resistance and the prices thereof are balanced. Especially, polyester fibers and nylon fibers are preferable.

As for the composition ratio of an organic fiber and a thermoplastic resin in the composite substrate (A), the volume ratio of the thermoplastic resin is preferably 20 parts to 900 parts and more preferably 25 parts to 400 parts with reference to 100 parts of the multifilament. When the ratio of the thermoplastic resin with reference to 100 parts of the organic fiber is 20 parts or more, the mechanical strength of the composite substrate (A) may be significantly increased. Further, when it is 900 parts or less, the reinforcing effect of the organic fiber may be sufficiently developed.

The fiber areal weight per a thickness of 10 mm in the composite substrate (A) is preferably in the range of 1000 g/m² to 12000 g/m². More preferably, it is 2000 g/m² to 10000 g/m². When the fiber areal weight is increased to 1000 g/m² or more, higher shock resistance may be developed. On the contrary, when it is 12000 g/m² or less, the mechanical strength of the composite substrate (A) may be increased.

As for the matrix resin in the composite substrate (A) of the present invention, a thermoplastic resin is used in the viewpoint of shock resistance. Among others, a resin which is a thermoplastic resin having a thermal deformation temperature of 80° C. or more is preferable. Here, a thermal deformation index may be evaluated using a load deflection temperature. When the thermal deformation temperature is 80° C. or more, the composite substrate (A) may also have high strength and high elasticity. When a thermosetting resin is used as for the matrix resin, the thermosetting resin is impregnated to the inside of the fiber bundles because the thermosetting resin prior to curing has low viscosity. On the other hand, when the thermoplastic resin is used, the resin is not impregnated into the inside of the fiber bundles and thus the physical properties of the composite substrate (A) are improved to increase the shock resistance.

As for the thermoplastic resin, for example, a vinyl chloride resin, a vinylidene chloride resin, a vinyl acetate resin, a polyvinyl alcohol resin, a polystyrene resin, an acrylonitrile-styrene resin (AS resin), an acrylonitrile-butadiene-styrene resin (ABS resin), an acryl resin, a methacrylate resin, a polyolefin resin (e.g., a polyethylene resin and a polypropylene resin), a polyamide resin (e.g., a polyamide 6 resin, a polyamide 11 resin, a polyamide 12 resin, polyamide 46 resin, a polyamide 66 resin, and a polyamide 610 resin), a polyacetal resin, a polycarbonate resin, a polyethylene terephthalate resin, a polyethylene naphthalate, a polybutylene terephthalate resin, a polyarylate resin, a polyphenylene ether resin, a polyphenylene sulfide resin, a polysulfone resin, a polyether sulfone resin, or a polyetheretherketone resin may be exemplified. They may be used solely or in combination.

Among them, the vinyl chloride resin, the polystyrene resin, the ABS resin, the polyethylene resin, the polypropylene resin, the polyamide 6 resin, the polyamide 66 resin, the polyacetal resin, the polycarbonate resin, the polyethylene terephthalate resin, the polyethylene naphthalate resin, the polybutylene terephthalate resin, and polyarylate resin are preferable. In view of moldability and productivity, the polypropylene resin, the polyethylene terephthalate resin, the polycarbonate resin, the polyamide 6 resin, and the polyamide 66 resin are more preferable.

Meanwhile, as described below, in view of facilitating welding, it is a preferable factor that the thermoplastic resin of the composite substrate (A) has a favorable compatibility in heat welding with the resin forming the shaped product (B1) and the shaped product (B2). For example, it may be properly selected from at least one kind selected from the group consisting of polyamide, polycarbonate, polyoxymethylene, polyphenylene sulfide, polyphenylene ether, polyethylene terephthalate, polybutylene terephthalate, polyethylene naphthalate, polyethylene, polypropylene, polystyrene, polymethyl methacrylate, AS resin, and ABS resin.

Without affecting the objects of the present invention, the composite substrate (A) may include various fillers or additives such as glass fibers and aramid fibers besides the above multifilament and thermoplastic resin. As for the additives, for example, a flame retardant, a thermal stabilizer, an ultraviolet absorber, a nucleation agent, a plasticizer, and a carbon black may be exemplified but not limited thereto.

A method of manufacturing the composite substrate (A) includes: producing a composite by impregnation of a thermoplastic into the space between fiber bundles; and shaping an obtained composite material. The method of impregnating the resin into space between the fiber bundles is not particularly limited. In a case where a multifilament to be used are in a form of a cloth of woven fabric or knit, by compressing or decompressing a woven fabric or knit and a resin film or non-woven fabric which are stacked one on another, using a press molding machine or vacuum molding machine at a temperature where the thermoplastic resin is melted but the multifilament is not melted, a composite material in which the thermoplastic resin is impregnated into the space between the fiber bundles is obtained. In addition, in a case where the multifilament is a twisted fiber cord, the composite material may also be obtained through extrusion molding or protrusion molding besides the press molding or the vacuum molding.

There is also no special limit on a shaping method. Shaping may be performed simultaneously when the space between the fiber bundles is impregnated with the resin or may be performed after the space between the fiber bundles is impregnated with the resin. When the resin impregnation and the shaping are performed simultaneously, a shaped product may be easily obtained by using a metal mold for obtaining a desired shape. When the resin impregnation and the shaping are separately performed, the shaping may also be relatively easily performed by using a mold form having a desired shape. The shaped product obtained in this manner may be used as the composite substrate (A) as it is.

By adjusting the shaping method as described above, a small or complicated shaped member as well as a large, flat or thin member may be manufactured. The shape of the shaped product may be a three-dimensional shape such as a corrugate shape, a truss shape, or a honeycomb shape besides the flat shape.

The resin impregnation into the space of fiber bundles and the inside of the fiber bundle may be properly controlled by changing a molding condition in addition to the configuration of twisted fibers, a woven fabric and a knit or the selection of the kinds of thermoplastic resins as described above. In general, when the molding temperature or pressure increases, the melt viscosity of a resin decreases and thus, the infiltration of the resin may increase. When the resin is a crystalline resin, the temperature is preferably in the range from the melting point to the melting point+50° C., and when the resin is an amorphous resin, the temperature is preferably in the range from the glass transition point to the melting point+50° C. The pressure is preferably in the range of 0.01 MPa to 20 MPa and the time is preferably in the range of about 30 sec to about 1 hour.

In a combination of the multifilaments and the thermoplastic resin, when the resin to be used is a crystalline resin, it is preferable that the melting point of the fibers is at least 10° C. higher than the melting point of the resin. In addition, when the resin to be used is an amorphous resin, it is preferable that the melting point of the fibers is at least 10° C. higher than the glass transition point of the resin. In this viewpoint, a combination in which the multifilaments are polyester long fibers or nylon fibers and the thermoplastic resin is a polypropylene resin, a polyethylene terephthalate resin, a polycarbonate resin, a polyamide 6 resin, or a polyamide 66 resin is preferable.

The composite substrate (A) has a penetration portion (D) that penetrates the composite substrate (A) in the thickness direction. The penetration portion (D) is required for joining the shaped products (B1) and (B2) as described below. The shaped products are fixed to each other through the penetration portion (D).

The penetration portion (D) is important in that both surfaces of the composite substrate (A) communicate with each other. The penetration portion (D) is typically in the form of a through hole (D1). The shape of the hole may be, for example, a cylindrical shape of which the cross section is a circle or an ellipse, a conical shape, a prismatic shape, a truncated pyramid shape or a combination thereof. When the cross section is a circular shape, the diameter of the bottom face or the cross section is in the range of 0.01 mm to 20 mm, preferably 1 mm to 20 mm. When the cross section is a quadrilateral, the quadrilateral is preferably a square shape or a rectangular shape having a side of which the length is in the range of 0.01 mm to 20 mm, preferably 1 mm to 10 mm. In the penetration portion, the shape or size of the hole in one surface of the composite substrate (A) may be the same as or different from the shape or size of the hole in the other surface.

In the present invention, the thickness of the composite substrate (A) is not particularly limited but may be in the range of about 0.5 mm to about 10 mm. The thickness of the composite substrate (A) at the joining portion (C) is preferably in the range of 0.5 mm to 10 mm. More preferably, it is in the range of 1 mm to 5 mm.

In addition, in the present invention, the composite substrate (A) has a joining portion (C) including the penetration portion (D). Here, the penetration portion is preferably in the range of 0.01% to 10% (area occupation rate) in relation to the area of the portion sandwiched between the shaped product (B-1) and the shaped product (B-2) to be described later. When the occupation rate is set to be 0.01% or more, a good joining property of the composite substrate (A), the shaped product (B1) and the shaped product (B2) may be easily maintained, and when it is set to be 10% or less, the demanded characteristics of strength or endurance of the joined body itself may be easily satisfied.

Figure 8:
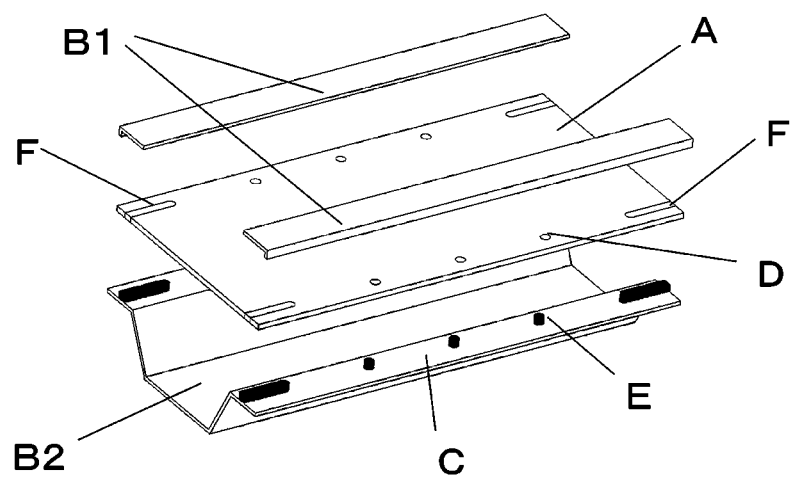
FIG. 8 is an example (exploded view) of a joined body in which shaped products (B1) and a shaped product (B2) are disposed on both sides of a composite substrate (A) having slits.

The composite substrate (A) may have a slit extending inward from the end of the composite substrate (A), for example, as illustrated in FIG. 8, besides the penetration portion (D). The slit has the same function as the penetration portion (D).

The penetration portion (D) is provided at the joining portion (C) in the present invention. The joining portion (C) is formed by laminating the shaped product (B1) provided on one side of the composite substrate (A) and the shaped product (B2) provided on the other side of the composite substrate (A).

[Shaped Products (B1) and (B2)]

The shaped products (B1) and (B2) include a carbon fiber and a resin.

Typical examples of the carbon fiber include PAN-based carbon fibers and pitch-based carbon fibers. Any of the PAN based carbon fibers and the pitch-based carbon fibers may be selected depending on use. However, when higher strength is required, the PAN-based carbon fibers may be used.

The types of the carbon fiber are not specially limited and may be either a continuous fiber or a discontinuous fiber. The continuous fiber may be, for example, a type of a unidirectional base material in which reinforcement fibers are aligned in one axial direction or a non-woven fabric, but it is not limited thereto. Also, the discontinuous fiber is not specially limited in relation to the fiber length. The "discontinuous" carbon fiber refers to a carbon fiber having an average fiber length in the range of 0.1 mm to 300 mm. The fibers other than the "discontinuous fiber" refer to "continuous fibers". As for the carbon fiber, a discontinuous fiber is preferable in view of moldability and a shaping property by a metal mold. The average fiber length is preferably in the range of 5 mm to 100 mm, more preferably 8 mm to 50 mm, further preferably 10 mm to 80 mm, and especially preferably 10 mm to 30 mm.

Here, the average fiber length is obtained as follows. The lengths of 100 carbon fibers randomly extracted are measured and recorded to 1 mm unit using a caliper and a loupe, and based on all the measured lengths of the carbon fibers ($L_i$, where i is an integer of 1 to 100), the average fiber length ($L_a$) is obtained by the following equation.

$$La = \Sigma Li/100$$

The average fiber lengths of the carbon fibers included in the shaped product (B1) and in the shaped product (B2) may be equal to or different from each other.

Hereinafter, a case where a discontinuous fiber having the average fiber length as described above is used as the carbon fibers will be described in detail.

In each of the shaped products (B1) and (B2), the content of carbon fibers in the shaped product is preferably 10% to 90% on volume ratio (Vf) with reference to the total volume of the shaped product. When Vf is 10% or more, a material having a high strength may be obtained. In addition, when Vf is 90% or less, it is possible to stably manufacture a shaped product which is excellent in moldability. More preferably, Vf is 20% to 55% and further preferably, Vf is 20% to 50%.

In the shaped products (B1) and (B2), it is preferable that the carbon fibers are overlapped in a random state without being especially oriented, that is, the carbon fibers are disorderly and randomly placed. When the carbon fibers are randomly placed, a shaped product which is isotropic in an in-plane direction and excellent in strength on the average may be obtained. Further, in terms of physical properties, for example, elasticity and electric conductivity, the shaped product is not basically anisotropic and is isotropic in an in-plane direction.

It is preferable that the above discontinuous carbon fibers contain carbon fiber bundles, each of which includes single fibers of not less than a critical number of single fiber, defined by the following Equation (1), in a volume ratio of 20% or more and less than 99% to the total volume of the carbon fibers.

$$\text{Critical number of single fiber} = 600/D \quad (1)$$

(Here, D is an average fiber diameter (μm) of the carbon fibers)

With respect to the average fiber diameter, the cross sections of fibers are magnified 1000 times or more using a microscope to be photographed, cross sections of 50 fibers are randomly selected, and diameters of the circumscribed circles of the cross sections are recorded as fiber diameters. Then, based on all the measured fiber diameters ($D_i$, where i is an integer of 1 to 50), the average fiber diameter ($D_a$) is obtained by the following equation.

$$Da = \Sigma Da/50$$

In a range other than the above-described range, it is preferable that there exist other opened fiber bundles being in a single fiber state or including single fibers of less than the critical number of single fiber, since the moldability of the shaped products (B1) and (B2) is good. Here, when the volume ratio of the carbon fiber bundles to the total volume of the carbon fibers becomes less than 20%, there may be an advantage in that a joined body having an excellent surface quality may be obtained. However, because it becomes difficult to heat the shaped products (B1) and (B2) uniformly, shaped products (B1) and (B2) having an excellent mechanical property may not be obtained. When the volume ratio of the carbon fiber bundles becomes 99% or more and thus increases the thickness of crossing portions of the carbon fibers locally, it may be difficult to obtain thin shaped products. In addition, the random property of the shaped products (B1) and (B2) tends to be easily deteriorated. The preferable range of the volume ratio of the carbon fiber bundles is not less than 30 Vol. % and less than 90 Vol. %.

It is preferable that the average number (N) of fibers in a carbon fiber bundle including single fibers of the critical number of single fiber or more satisfies the following Equation (2).

$$0.7\times10^4/D^2 < N < 1\times10^5/D^2 \quad (2)$$

(Here, D is the average fiber diameter (μm) of the carbon fibers)

With respect to the average number of fibers, all the fiber bundles are taken with tweezers from a shaped product sample having a size of about 100 mm×100 mm, and the bundle number (I) of the carbon fiber bundles (A) and the lengths (Li) and weights (Wi) of the carbon fiber bundles are measured and recorded. For fiber bundles which are too small to be taken with the tweezers, the total weight (Wk) of the fiber bundles is collectedly measured at the end. In measuring the weights, a pair of scales capable of measuring to 1/100 mg (0.01 mg) is used. Based on the fiber diameter (D) of the carbon fibers, the critical number of single fiber is calculated and the carbon fiber bundles are classified into the carbon fiber bundles (A) having single fibers of the critical number of single fiber or more and the other bundles. When two or more kinds of carbon fibers are used, the carbon fiber bundles are classified by kinds and each kind is measured and evaluated. A method of obtaining the average number (N) of fibers in the carbon fiber bundles (A) is as follows. The number (Ni) of fibers in each of the carbon fiber bundles is obtained by the following equation based on the tex (F) of the used carbon fibers.

$$Ni = Wi/(Li \times F)$$

The average number (N) of fibers in the carbon fiber bundles (A) is obtained by the following equation based on the bundle number (I) of the carbon fiber bundles (A).

$$N = \Sigma Ni/I$$

The ratio (VR) of the carbon fiber bundles (A) to the total volume of fibers is obtained by the following equation using the density (ρ) of the carbon fibers.

$$VR = \Sigma(Wi/\rho) \times 100/((Wk + \Sigma Wi)/\rho)$$

Specifically, when the average fiber diameter of the carbon fibers is 5 μm to 7 μm, the critical number of single fiber becomes 86 to 120. When the average fiber diameter of the carbon fibers is 5 μm, the average number of fibers in the fiber bundles is in the range of 280 to 4000, preferably 600 to 2500. When the average fiber diameter of the carbon fibers is 7 μm, the average number of fibers in the fiber bundles is in the range of 142 to 2040, preferably 300 to 1600.

When the average number (N) of fibers in the carbon fiber bundles is $0.7\times10^4/D^2$ or less, it may be difficult to obtain a high fiber volume content (Vf). In addition, when the average number (N) of fibers in the carbon fiber bundles is $1\times10^5/D^2$ or more, a thick portion may be locally formed, which is likely to cause the existence of voids. If merely separated fibers are used in order to obtain thin shaped products (B1) and (B2) of 1 mm or less, unevenness in density of fibers in the shaped products may become large and thus a good physical property may not be obtained. In addition, when all the fibers are opened, a thinner shaped product may be obtained, but the crossing of fibers may be increased, and thus a high fiber volume content may not be obtained. When there exist both of carbon fiber bundles containing single fibers of not less than the critical number of single fiber defined by equation (1) above and carbon fibers being in the single fiber state or including single fibers of less than the critical number of single fiber, shaped products (B1) and (B2) which may be thinned and have a high physical property development rate may be realized.

In the present invention, it is preferable that, in the shaped products (B1) and (B2) in which the carbon fibers are randomly placed, the carbon fibers include discontinuous carbon fibers having an average fiber length of 5 mm to 100 mm and the carbon fibers are randomly orientated substantially two-dimensionally in the in-plane direction with a fiber areal weight of 25 g/m² to 3000 g/m².

Meanwhile, in the present invention, tensile modulus is measured by performing a tensile test in each of an arbitrary direction and a direction orthogonal to the arbitrary direction in a plane of the finally-obtained joined body and, between the modulus values, a ratio Eδ is calculated by dividing the large value by the small value. When the value of Eδ does not exceed 2, it is assumed to be isotropic, and when Eδ does not exceed 1.3, it is assumed to be better isotropic.

The resin included in the shaped products (B1) and (B2) may be either a thermosetting resin or a thermoplastic resin. However, the thermoplastic resin is more suitably used in view of productivity.

Such plastic resin is not particularly limited and may be properly selected from at least one kind selected from the group consisting of, for example, polyamide, polycarbonate, polyoxymethylene, polyphenylene sulfide, polyphenylene ether, polyethylene terephthalate, polybutylene terephthalate, polyethylene naphthalate, polyethylene, polypropylene, polystyrene, polymethyl methacrylate, AS resin, and ABS resin. The shaped products (B1) and (B2) may be made of the same resin or different resins. However, in view of heat welding, it is preferable to select the same resin as the resins of the shaped product (B1) and the shaped product (B2). In view of welding, it is more preferable that all the thermoplastic resins of the composite substrate (A), the shaped product (B1) and the shaped product (B2) are the same. When all the resins are the same, the composite substrate (A) and the shaped product (B1) and the composite substrate (A) and the shaped product (B2) may be easily heat-welded to each other. In addition, when a shock is received, the peel-off of the joining portion (C) may be sufficiently prevented and the shock resistance may be further improved. In addition, even if the resins are not the same, for example, combinations such as ABS resin and polycarbonate, and ABS resin and acryl resin, may be preferably exemplified, but the combinations are not limited thereto.

The shaped product (B1) and the shaped product (B2) may contain various fillers or various additives such as glass fibers and aramid fibers besides carbon fibers without affecting the objects of the present invention. As for the additives, for example, a flame retardant, a thermal stabilizer, an ultraviolet absorber, a nucleation agent, a plasticizer, and a carbon black may be exemplified but not limited thereto.

The weight ratio of the discontinuous carbon fibers contained in the joining portion (C) in the shaped products (B1) and (B2) is preferably 10 to 1000 weight parts per 100 weight parts of the thermoplastic resin. The weight ratio of the discontinuous carbon fibers is more preferably 10 to 300 weight parts, further preferably 10 to 150 weight parts per 100 weight parts of the thermoplastic resin. However, the weight ratio of the carbon fibers contained in any composite material other than the joining portion (C) is not limited thereto.

Each of the shaped products (B1) and (B2) may have a desired shape. For example, a plate shape, a corrugated plate shape and a box shape may be exemplified. However, in order to form a structure in which the composite substrate (A) is sandwiched between the shaped products (B1) and (B2) and the shaped products (B1) and (B2) are fixed to each other, it is required to have the joining portion (C). Typically, the joining portion (C) preferably has a flat shape, and thus, it is preferable that, for example, at least the portions of the shaped products (B1) and (B2) which constitute the joining portion (C) are flat.

The shaped products (B1) and (B2) may have the same shape or different shapes. For example, when the shaped product (B2) is formed in a hat shape in cross section as illustrated in FIG. 1, the space between the composite substrate (A) and the shaped product (B2) becomes a shock absorbing space, which is preferable.

A method of manufacturing the shaped products (B1) and (B2) is not particularly limited. When the discontinuous fibers are used as the carbon fibers, for example, pellets (long-fiber pellets) is formed by coating the carbon fibers with a resin and then cutting the carbon fibers, that is, pellets is obtained by impregnating a melted resin with an adjusted viscosity to the carbon fibers, and subsequently cutting the carbon fibers, and the obtained pellets may be formed into a shape using an injection molding machine. In addition, as another method, a sheet-like composite material containing carbon fibers is manufactured by overlapping the carbon fibers and a thermoplastic resin of a sheet, a film, pellets or powders and heating and pressing them. Subsequently, for example, a single layer or plural stacked layers of such composite material may be press-formed using, for example, a metal mold to a desired shape.

As described above, it is preferable that the above discontinuous carbon fibers are randomly placed. Here, a method of randomly placing the discontinuous carbon fibers is not particularly limited. In order to prevent the discontinuous carbon fibers from being placed in a specific direction in a plane, for example, the discontinuous carbon fibers may be mechanically or artificially sprayed without directionality and, for example, by sending air as needed.

The shaped products (B1) and (B2) are fixed through a penetration portion (D) of the composite substrate (A). The penetration portion (D) is formed at the joining portion (C) in the present invention. In the joining portion (C), a structure in which the composite substrate (A) as a core is sandwiched by the shaped products (B1) and (B2) is formed.

It is preferable that the shaped products (B1) and (B2) are formed with a protrusion (E) capable of being inserted into the penetration portion (D) in the sandwich structure. The protrusion (E) may be formed on any one of the shaped products (B1) and (B2) but may also be formed on each of the shaped products (B1) and (B2).

The shape of the protrusion (E) may be the same as or different from that of the penetration portion (D). For example, a columnar shape, a conical shape or a prismatic shape may be properly selected. The size (length) in a plane direction of the protrusion (E) only needs not to exceed the size of the penetration portion (D). In addition, the length (height) of the protrusion (E) in a direction perpendicular to the plane direction only needs not to exceed the length (depth) of the penetration portion (D). However, the height of the protrusion may be not less than the length of the composite substrate (A) in the thickness direction, preferably not more than 1.35 times of the square root of a cross-sectional area of the protrusion. The height of the protrusion which is not more than 1.35 times of the square root of the cross-sectional area of the protrusion is preferable since the protrusion (E) is stable without falling down when it is fixed by welding.

For example, in a case where only the protrusion (E) on the shaped product (B1) is inserted into the penetration portion (D), it is preferable that the height of the protrusion (E) is not less than 90 and less than 100 assuming that the depth of the penetration portion (D) is 100. In addition, in a case where the protrusions (E) on both of the shaped products (B1) and (B2) are inserted into the penetration portion (D), it is preferable that the sum of the heights of the protrusions of both shaped products is in the range of not less than 90 and less than 100. In a case where the shaped products (B1) and (B2) are welded using an ultrasonic welding method as described later, the range is preferably not less than 90 and less than 100.

In addition, it is preferable that the total volume of the protrusion (E) is more than 1% and less than 100% of the volume of the penetration portion (D) formed in the composite substrate (A). When the total volume is more than 1%, the gap between the protrusion (E) and the penetration portion (D) is filled with the thermoplastic resin. Thus, a high strength may be obtained at the joining portion (C). On the contrary, when the total volume is less than 100%, which is preferable, the resin does not become excessive so that unnecessary burrs may not be formed and distortion may not be generated at the joining portion (C). The range is preferably more than 50% and less than 100%.

The number of the protrusion (E) may be one or two or more, and it may not be more than the number of penetration portions (D). In a case where two or more protrusions are provided, an interval between neighboring protrusions is not particularly limited but is preferably in the range of 15 mm to 150 mm. The intervals may not be equal to each other.

The protrusions (E) may be formed on the surfaces of the shaped product (B1) and/or the shaped product (B2) using a desired metal mold when press-forming a sheet-shaped composite material containing the carbon fibers as described above. The protrusions (E) formed in this manner have the same composition (material) as the shaped product (B1) and/or the shaped product (B2) and are excellent in strength. In addition, the protrusions (E) may be separately fabricated and adhered to the surfaces of the shaped product (B1) and/or the shaped product (B2) using an adhesive.

[Joining Portion (C)]

The joining portion (C) in the present invention is substantially flat and the shaped product (B1), the composite substrate (A), and the shaped product (B2) are laminated in this order. Then, in the joining portion (C), at least the shaped products (B1) and (B2) are fixed through the penetration portions (D), thereby forming the joined body of the present invention which is excellent in shock resistance and strength.

Figure 2:
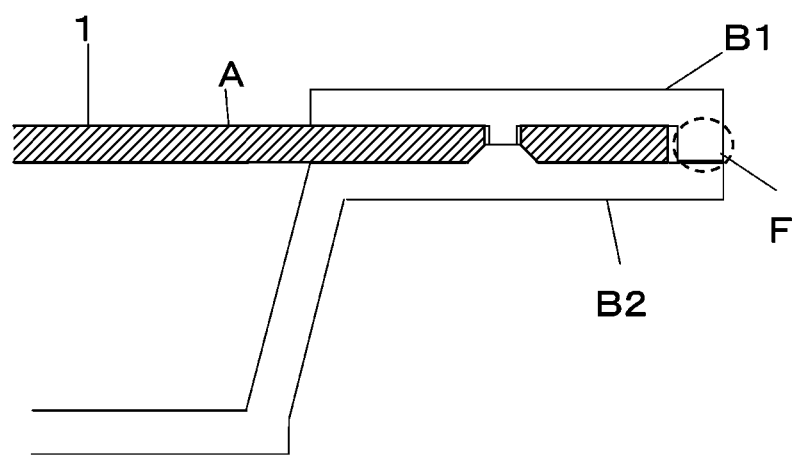
FIG. 2 is an example of enlarged schematic view (cross-sectional view) of a joining portion (C).
Figure 3:
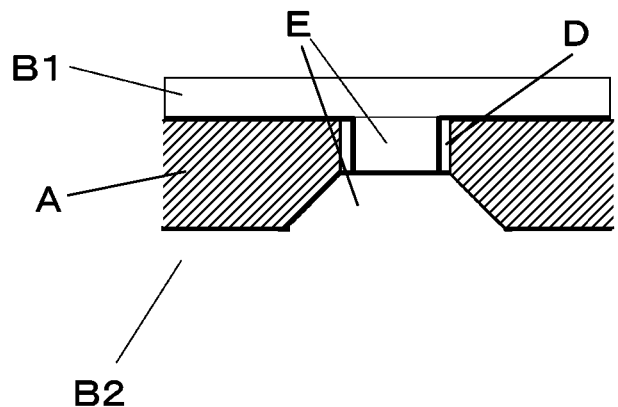
FIG. 3 is an example of an enlarged schematic view (cross-sectional view) of a portion of a through hole (D1) and a protrusion (E) of the joining portion (C).

As exemplified in FIGS. 2 and 3, the composite substrate (A) is formed with penetration portions (D) that penetrate in the thickness direction. At least one of the shaped product (B1) and the shaped product (B2) is formed with protrusions (E). The shaped product (B1) and the shaped product (B2) are contacted with and fixed to each other through the protrusions (E) inserted into the penetration portions (D). In a case where the protrusions are provided both of the shaped product (B1) and the shaped product (B2), the fixation is achieved when the tip ends of the protrusions are joined with each other in the penetration portions (D). In a case where one of the shaped products (B1) and (B2) is provided with the protrusions, the fixation is achieved when the tip ends of the protrusions are contacted with the surface of the other shaped product which is not provided with the protrusion.

In the present invention, in order to increase the shock resistance by increasing the strength of the joining portion (C), one end of the shaped product (B1) or the shaped product (B2) may have an L-shape (F in FIG. 2) to cover the end of the composite substrate (A) as illustrated in FIGS. 2 and 3. In such a case, the L-shaped tip end of the shaped product (B2) may be contacted with the other side shaped product (B1) and joined thereto, for example, by heat welding or an adhesive.

[Joining Sequence]

A preferable method of manufacturing the joined body of the present invention will be described with reference to FIGS. 2 to 5 in the following sequence. However, the present invention is not limited thereto.
1. Formation of penetration portion (D) in composite substrate (A), and
2. Fixation of shaped product (B-1) and shaped product (B-2) by inserting protrusion (E) into penetration portion (D)
1. Formation of a Penetration Portion (D)

Figure 4:
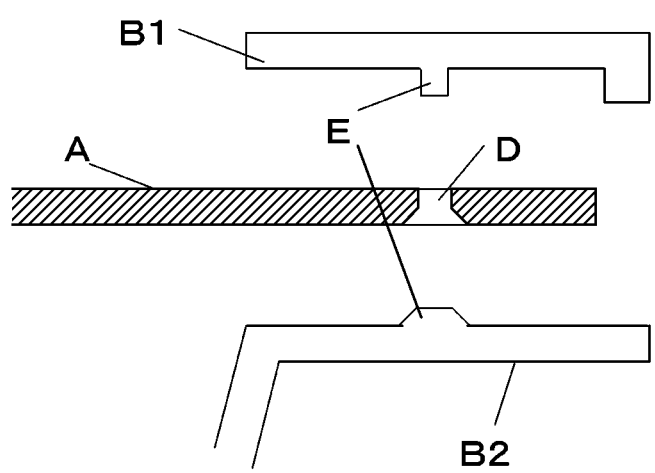
FIG. 4 is an example of a schematic view (exploded view) of the shaped product B1 and the shaped product (B2) in the joining portion (C).

First, the penetration portion (D) that penetrates the composite substrate (A) in the thickness direction is processed (D of FIG. 4). It is preferable that the boring processing is performed while fusion-cutting a thermoplastic resin and multifilaments. Here, "fusion cutting" is to cut the thermoplastic resin and the multifilaments while melting the thermoplastic resin and the multifilaments by heating. Other ways, for example, a mechanical drilling processing by a drill, may be exemplified as a boring processing. With the fusion-cutting, the generation of burr during the processing does not matter. In addition, the fusion-cutting is preferable since it does not result in deterioration of physical properties around the hole which may be caused when applying unnecessary tension to the multifilaments. Further, the fusion-cutting by ultrasonic wave is especially preferable since it may also be used when welding the composite substrate (A), the shaped product (B1), and the shaped product (B2).
2. Fixing the Shaped Product (B1) and the Shaped Product (B2) by Inserting a Protrusion (E) into the Penetration Portion (D)

As illustrated in FIG. 4, the shaped product (B1) and the shaped product (B2) are provided at both sides of the composite substrate (A) to fabricate a joining portion as illustrated in FIGS. 2 and 3. The protrusion (E) may be formed on at least one of the shaped product (B1) and the shaped product (B2). However, in view of positioning, it is preferable to form the protrusion (E) on each of the shaped product (B1) and the shaped product (B2).

The protrusion (E) is inserted into the penetration portion (D) to be fixed. A fixing method may be, for example, a joining method by an adhesive containing a thermoplastic resin or a thermosetting resin or by heat welding. In the present invention, fixing by heat welding is preferable since it is convenient and excellent in strength. The heat welding method may be such as, for example, heat plate welding, welding by infrared ray heating, welding by electromagnetic induction heating, vibration welding, ultrasonic welding, electric resistance welding, or laser welding but is not limited thereto. In the present invention, the ultrasonic welding is especially preferable in view of the efficiency of the processing process since it may also be used for the boring processing of the composite substrate (A).

Figure 5:
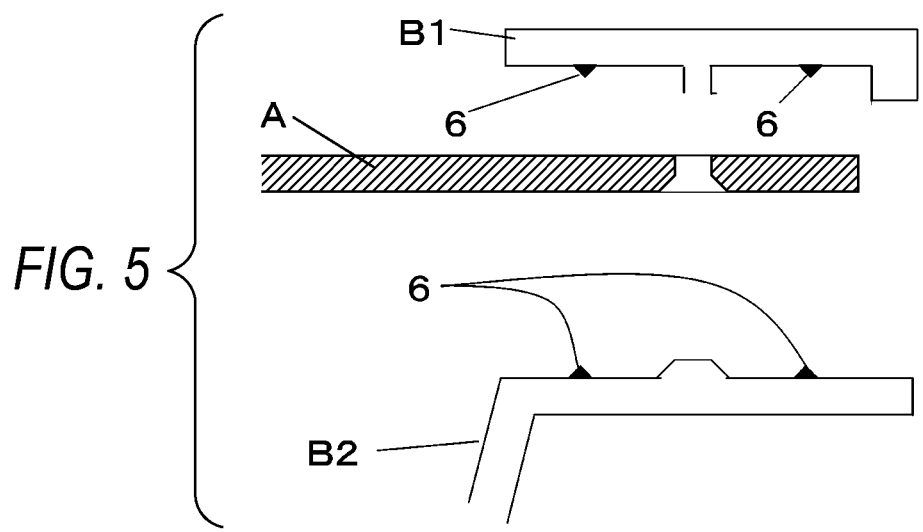
FIG. 5 is an example of a schematic view in a case in which a joined body is obtained using a shaped product (B1) and a shaped product (B2) which have energy directors.

In a case the ultrasonic welding is used, projections called an energy director may be formed on each of the surfaces of the shaped products (B1) and (B2) where the protrusions exist, for the purpose of efficient welding (6 in FIG. 5). The energy directors are configured to intensively receive vibration to readily melt the shaped products including the resin and to weld the shaped products uniformly. It is preferable to form the energy directors on the joining surfaces of the shaped product (B1) and the shaped product (B2) (4 and 5 in FIG. 5). For the joining surfaces of the composite substrate (A) and the shaped product (B1) (2 in FIG. 5) and the joining surfaces of the composite substrate (A) and shaped product B2 (3 in FIG. 5), it is preferable to provide the energy directors at (B1) and (B2) sides, as well. There is no limitation on the shape of the energy directors. However, for example, any of the energy directors may have a triangular pyramid shape as illustrated in FIG. 5 so as to bring the apexes of the energy directors into contact with the joint counterpart side (6 in FIG. 5).

In a case using the ultrasonic welding, it is preferable that an ultrasonic vibration portion of an ultrasonic welder and a joining surface are close to each other. This is because the welding efficiency is increased since the ultrasonic vibration is less attenuated as the thickness of a resin layer is reduced. Therefore, although there is no limitation on the plate thickness of the shaped product (B1) or the shaped product (B2) which is the ultrasonic vibration side, the plate thickness is preferably not more than 10 mm, more preferably not more than 5 mm. On the contrary, the plate thickness of not less than 0.5 mm is preferable in view of the improvement of the shock resistance of the joined body.

In addition, depending on implementing aspects, the composite substrate (A) and the shaped product (B2) may be joined using an adhesive therebetween. Further, the protrusion may be joined with the composite substrate (A) by the resin.

[Joined Body]

The joined body of the present invention is excellent in strength and shock resistance since it has a sandwich structure at the joining portion (C). In addition, the joined body has a composite substrate (A), which is excellent in shock resistance in itself, on a surface thereof. Especially, in the composite substrate (A), the multifilaments, strictly speaking, the fibers in the inside of the fiber bundles have a degree of freedom in deformation or movement. With this configuration, the shock directly applied to the joined body at the composite substrate (A) may be absorbed by the degree of freedom involving destruction. Thus, the joined body of the present invention is excellent in shock resistance.

In general, in a case where the shock resistance of a molded body that has received a shock is weak, when the shock was received, the molded body, which directly received the shock, is destroyed before the joining portion of the joined body is peeled off. However, in the joined body of the present invention having the joining portion with a specific structure, the strength required for peeling off the joining portion is increased and thus, the joining portion is hardly peeled off. As a result, the shock resistance of the joined body is improved overall.

[Vehicle Component]

The joined body of the present invention is excellent in shock resistance and rigidity, and thus it may be preferably used for a vehicle component, for example, a structural component, an exterior component, or an interior component for an automobile. Especially, due to the excellent shock resistance, it is suitable for a shock absorbing member such as, for example, a seat, a floor pan, a bonnet, or a door.

According to the foregoing, it will be evident that the present invention includes specific feature as follows.

A joined body includes a joining portion constituted by a shaped product (B1), a composite substrate (A) and a shaped product (B2) which are laminated in this order, in which the composite substrate (A) contains a plurality of multifilaments of polyester and a thermoplastic resin, the shaped products (B1) and (B2) contain carbon fiber and a thermoplastic resin, and the carbon fibers are randomly placed in the shaped products (B1) and (B2), and further, (i) the composite substrate (A) includes an impregnation portion in which a space between the multifilaments are impregnated with the thermoplastic resin and a non-impregnation portion in which the inside of a multifilament is not impregnated with the thermoplastic resin, (ii) the composite substrate (A) has a through hole (D1) which penetrates the composite substrate (A) in the thickness direction, (iii) the shaped products (B1) and (B2) are fixed by heat welding through the through hole (D1) of the composite substrate (A), and (iv) at least one of the shaped products (B1) and (B2) has a protrusion (E) on a surface thereof, and the protrusion (E) is disposed within the through hole (D1).

EXAMPLES

Hereinafter, the present invention will be described in detail based on embodiments, but the present invention is not limited thereto.
[Evaluation Method]
(Weight Drop Test)

A shock resistance was evaluated by setting a composite substrate (A) side to face upward and dropping an iron ball of which the weight is known above the composite substrate such that the iron ball falls to the center of the composite substrate (A). In the test, an 8 Kg iron ball was used and the drop height was gradually increased so as to evaluate the peel-off at the joining portion (C) of the composite substrate (A), the shaped product (B1) and the shaped product (B2). The measurement result is shown in Table 1.
(Resin Impregnation Rate in Space Between Multifilaments)

The composite substrate (A) was cut using a microtome and the cross section was observed using a microscope. Although not illustrated, a plurality of round shapes observed in the cross section were contours of cross sections of single fibers in the multifilaments and circles observed in a densely collected state each are a multifilament (a fiber bundle). Observed as white around the outside of each of the circles is the thermoplastic resin. Observed as black are pore portions (voids). A void rate was calculated by performing a binarization processing the space between the multifilaments in the cross section (100 µm×100 µm), and a value left by subtracting the void ratio from 100% was calculated as the resin impregnation rate between the space of the multifilaments.
(Resin Impregnation Rate in the Inside of Multifilament)

A measurement was made on how many single fibers that form a multifilament taken out from the composite substrate (A) may be taken out. Assuming that the number of single fibers of a multifilament is X and the number of single fibers which were taken out is Y, the resin impregnation rate of the inside of the multifilament equals to 1−Y/X (%).

Manufacturing Example 1

Preparation of Twisted Fiber Cord Made of Polyethylene Terephthalate

Using the polyethylene terephthalate fibers (P900M 1100T250 filaments) manufactured by Teijin Fiber Co., Ltd. as raw fibers and a ring fiber-twister manufactured by Kaji Tech Co., Ltd., the primary twist of 275 times/m was plied in a Z-direction (the twisting coefficient is 3.0). Next, two primary twist fibers are piled and the final twist of 200 times/m was plied in an S-direction (the twisting coefficient is 3.0), thereby obtaining twisted fiber cords. The diameter of one twisted fiber cord was 0.5 mm.

Manufacturing Example 2

Fabrication of Composite Substrate (A)

The twisted fiber cords obtained in Manufacturing Example 1 were wound on a flat aluminum plate, which has a polyamide 6 film (Emblem ON film manufactured by Unitika Ltd., standard grade, a thickness of 25 µm) stuck to one side of the flat aluminum plate, substantially in one direction to have a uniform thickness and a fiber areal weight of 200 g/m². Subsequently, the aluminum plate wound with the twisted fiber cords was subjected to hot press at 270° C. for 60 seconds using a hand press provided with a heating device. Finally, the twisted fiber cords on the side of the aluminum plate to which the polyamide 6 film was not stuck, thereby a unidirectional material of twisted fiber cords which was partially impregnated with the resin was obtained.

Three sheets of such unidirectional materials were prepared.

A layered body was obtained by sequentially stacking the three sheets of unidirectional materials in a 0 degree direction, a 90 degree direction and a 0 degree direction, respectively, with reference to the fiber direction of the unidirectional materials. The layered body was cut in a proper size and heated and pressed at 270° C. again to obtain a shaped product of width 150 mm×depth 300 mm×thickness 3.0 mm (width: X-axis direction in FIG. 1, depth: Z-axis direction in FIG. 1, thickness: Y-axis direction in FIG. 1).

Finally, a through hole was formed in the shaped product using an ultrasonic processing machine (ultrasonic wave frequency: 20 kHz, pressurizing force: 500 N, horn diameter: Φ3.5) to obtain a composite substrate (A) having the total resin content of 30%. The resin impregnation rate in the space of the multifilaments of this composite substrate was 95%, the resin impregnation rate in the inside of the multifilaments was 30%, and the volume fraction of the fibers was 40% (see Table 1). A shaped product (A') refers to a shaped product which is not formed with the through hole.

Manufacturing Example 3

Fabrication of Shaped Product (B1) and Shaped Product (B2)

Shaped products in which carbon fibers (manufactured by Toho Tenax Co., Ltd., STS40, average fiber diameter: 7 µm) were cut to 20 mm in average were used as the shaped product (B1) and the shaped product (B2). As the matrix resin, polyamide 6 (Unitika Nylon 6 manufactured by Unitika Ltd.) was used. On a film of the polyamide 6, the above carbon fibers cut were randomly placed in an in-plane direction such that the average fiber areal weight became 540 g/m² and the weight ratio of the carbon fibers became 52% (Vf 40%) (see Table 1).

The precursor materials of the shaped products (B1) and (B2) obtained in this manner was press-formed for 60 seconds at a material preheating temperature of 250° C., a mold temperature of 100° C., and a pressure of 10 MPa using a given metal mold that forms protrusions. Thus, a flat shaped product (B1) having a thickness of 1.5 mm and a hat shaped shaped product (B2) having a thickness of 1.5 mm as illustrated in FIG. 1 were fabricated. Here, the carbon fibers have a critical number of single fiber of 86, and the average number (N) of fibers in a carbon fiber bundle including single fibers of the critical number of single fiber or more were 142 to 2040. Here, the width of the joining portion (C) was set to 20 mm, both the thicknesses of the shaped products (B1) and (B2) at the joining portion (C) were set to 1.5 mm (width: X-axis direction in FIG. 1, depth: Z-axis direction in FIG. 1, thickness: Y-axis direction). As illustrated in FIGS. 2 and 3, the protrusion (E) was formed in a truncated conical shape in which the bottom diameter is 3 mm, the inclination from a direction perpendicular to the bottom is 5°, and the height is 1.6 mm. Protrusions were formed on one side surface of each of the shaped product (B1) and the shaped product (B2) while manufacturing the shaped products (simultaneously with molding) such that a protrusion on one shaped product correspond one to one with one on the other.

As the shaped product (B1), two kinds of shaped products (B11) and (B12) were prepared. The shaped product (B11) does not have the portion that covers an end of the composite substrate (A) (F in FIG. 2) and the shaped product (B12) has the portion that covers the end of the composite substrate (A) (F in FIG. 2).

The shaped product (B11) was set to be width 300 mm×length 22 mm×thickness 1.5 mm. The shaped product (B12) was set to be width 300 mm×length 22 mm×thickness 1.5 mm and an end portion of the shaped product (B12) was extended by 3 mm in the thickness direction to have a height of 4.5 mm (height: Y-direction in FIG. 1 in the entire length of the shaped product) in order to cover the end of the composite substrate (A)).

Figure 6:
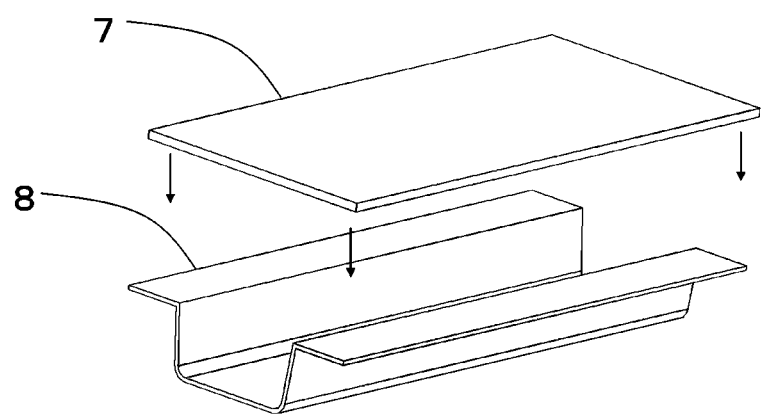
FIG. 6 is a schematic view (exploded view) illustrating a joined body in which a shaped product (A') which has no through hole and a shaped product (B') which has no protrusion are joined to each other.

The shaped product (B2) and the shaped product (B') which has no through hole each have a hat shape in cross section as illustrated by (B2) in FIGS. 1 and 8 in FIG. 6 and each were width 300 mm×length 150 mm×thickness 1.5 mm and the height thereof was 30 mm.

Example 1

As illustrated in FIGS. 1 to 3, shaped products (B11) and shaped products (B2) obtained in Manufacturing Example 3 were used and both end portions of a composite substrate (A) obtained in Manufacturing Example 2 were interposed between the shaped products. Subsequently, these portions (the joining portions (C)) interposed by the shaped products being laminated were welded by ultrasonic welding to obtain a joined body. Eδ of (B11) and (B2) was 1.0. At this time, the ultrasonic wave frequency was 20 kHz and the pressurizing force was 1500 N. Subsequently, a weight drop test was performed on the obtained joined body. The iron ball drop height was increased by 0.25 m from 0.2 mm. As a result, at the height of 1.95 m, the joining portions (C) were peeled off. The result is shown in Table 1.

Example 2

A Joined body was fabricated in the same conditions as those in Example 1 except that the shaped products (B12) obtained in Manufacturing Example 3 as the shaped product (B1). Eδ of (B1) and (B2) was 1.0. A weight test was performed on the obtained joined body. The iron ball drop height was increased by 0.25 mm from 0.2 mm. As a result, at the height of 2.45 m, the joining portions (C) were peeled off. The result is shown in Table 1.

Comparative Example 1

Figure 7:
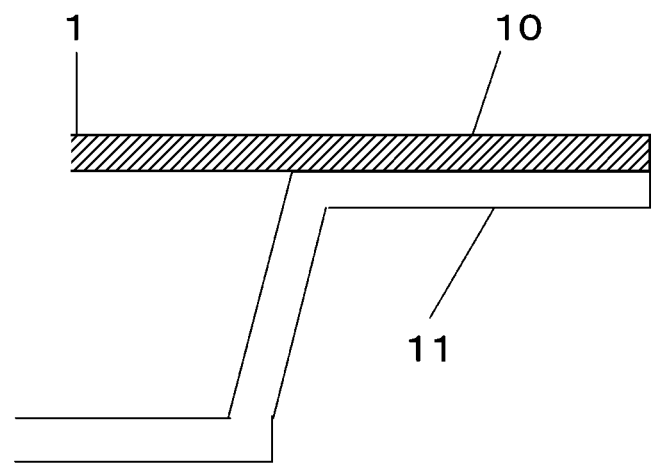
FIG. 7 is a schematic view illustrating a joining portion in which a shaped product (A') which has no through hole and a shaped product (B') which has no insertion portion are joined to each other.

A Joined body having a shape as illustrated in FIG. 7 were fabricated by joining the portions interposed by the shaped products being laminated by ultrasonic welding in the same manner as in Example 1, except that shaped product (A') which has no through hole and shaped products (B') which have no protrusion were used. Eδ of (B11) and (B2) was 1.0.

A weight drop test was performed on the joined body. When the iron ball drop height was 1.7 m, the joining portions were peeled off. The result is shown in Table 1.

Example 3

A Joined body was fabricated in the same conditions as those in Example 2 except that the resin impregnation rate was 60% in the inside of the fiber bundles by reducing the pressurizing time. Eδ of (B1) and (B12) was 1.0. A weight drop test was performed on the obtained joined body. The iron ball drop height was increased by 0.25 mm from 0.2 m. As a result, at the height of 1.95 m, the joining portions (C) were peeled off. The result is shown in Table 1.

TABLE 1

|  |  | Example 1 | Example 2 | Example 3 | Comp. Example 1 | Ref. Example |
|---|---|---|---|---|---|---|
| Composite substrate (A) | Resin content | 30% | 30% | 30% | 30% | 80% |
|  | Volume fraction of nylon 6 in composite substrate (A) | 60 | 60 | 60 | 60 | 60 |
|  | Volume fraction of PET long fibers in composite substrate (A) | 40 | 40 | 40 | 40 | 40 |
|  | Resin impregnation rate in space between fiber bundles | 95 | 95 | 95 | 95 | 100 |
|  | Resin impregnation rate inside of fiber bundle | 30 | 30 | 60 | 30 | 100 |
| Shaped product (B11) | Weight part of nylon 6 in shaped product (B11) | 48 | — | — | None | None |
|  | Weight part of carbon fibers in shaped product (B11) | 52 |  |  |  |  |

TABLE 1-continued

| | | Example 1 | Example 2 | Example 3 | Comp. Example 1 | Ref. Example |
|---|---|---|---|---|---|---|
| Shaped product (B12) | Weight part of nylon 6 in shaped product (B12) | — | 48 | 48 | | |
| | Weight part of carbon fibers in shaped product (B12) | | 52 | 52 | | |
| Shaped product (B2) | Weight part of nylon 6 in shaped product (B12) | 48 | 48 | 48 | 48 | |
| | Weight part of carbon fibers in shaped product (B12) | 52 | 52 | 52 | 52 | |
| Weight drop test | Height at which joining portion was peeled off | 2 m | 2.45 m | 1.95 m | 1.7 m | 0.7 m |

Reference Example

A strand-shaped composite material in which short polyethylene terephthalate fibers were mixed in a polyamide 6 resin was obtained by kneading of the polyethylene terephthalate fibers having a cut length of 1 mm and the polyamide 6 resin (Unitika Nylon 6 manufactured by Unitika Ltd.) as the matrix resin using a single screw extruder TP15 type manufactured by TPIC Co., Ltd. at 210° C. for 1 minute. Subsequently, the composite material was pelletized and molded pieces (test specimens) for use in a weight drop test were fabricated using a compact injection molder EP5 type manufactured by Nissei Plastic Industrial Co., Ltd. at an injection temperature of 210° C. The cross sections of the test specimens were observed using a laser microscope. The short fibers were separated into a single fiber level and well dispersed in the resin (non-impregnation portion did not exist and the resin impregnation rate in the space between the bundles were 100%). Meanwhile, the resin content was 80%.

A ball drop test was performed on a shaped product (A″) in which the polyethylene terephthalate fibers were completely impregnated with the matrix resin. At the iron ball drop height of 0.7 m, the shaped product (A″) was destroyed. The result is shown in Table 1.

Example 4

A joined body is fabricated in the same manner as in Example 2 except that the thermoplastic resin used for the composite substrate (A) is polypropylene and the temperature during the molding is 180° C. A weight drop test is performed on the obtained joined body. The iron drop height is increased by 0.2 m from 0.25 m. As a result, the joining portion (C) is peeled off before arriving at the height of 2.45 m.

DESCRIPTION OF SYMBOLS

A: composite substrate
B1: shaped product
B2: shaped product
D: penetration portion (through hole)
E: insertion portion (protrusion)
F: slit
X: width direction
Y: thickness direction, height direction
Z: depth direction
1: impact load
6: energy director
7, 10: composite substrate (A') having no through hole
8, 11: shaped product (B') having no insertion portion (protrusion)

INDUSTRIAL APPLICABILITY

The joined body of the present invention is excellent in shock resistance and rigidity. Thus it is useful for vehicle purpose, for example, as a structural component, an exterior component or an interior component of an automobile.

The invention claimed is:
1. A joined body comprising: a joining portion (C) constituted by a shaped product (B1), a composite substrate (A), and a shaped product (B2) which are laminated in this order,
   wherein the composite substrate (A) contains a plurality of multifilaments of an organic material and a thermoplastic resin, and the shaped products (B1) and (B2) each contain carbon fiber and a resin, and
   wherein
   (i) the composite substrate (A) includes: one impregnation portion in which a space between the multifilaments is impregnated with the thermoplastic resin and in which an impregnation rate of the thermoplastic resin in the space between the multifilaments is in a range of 90% to 100% and another impregnation portion in which an inside of a multifilament is impregnated with the thermoplastic resin and in which an impregnation rate in the inside of the multifilament is in a range of 0 to 50%,
   (ii) the composite substrate (A) has a penetration portion (D) which penetrates the composite substrate (A) in a thickness direction,
   (iii) the shaped products (B1) and (B2) are contacted with and fixed through the penetration portion (D) of the composite substrate (A), and
   (iv) the multifilaments are twisted fiber cords in which two primary twisted fibers are piled and a final twist is plied to the two primary twisted fibers.
2. The joined body according to claim 1, wherein the multifilaments contains a continuous fiber.
3. The joined body according to claim 1, wherein the composite substrate (A) contains the thermoplastic resin in a range of 20 parts to 900 parts with reference to 100 parts of the multifilaments on volume ratio.
4. The joined body according to claim 1, wherein the carbon fiber has an average fiber length in the range of 0.1 mm to 300 mm.
5. The joined body according to claim 4, wherein carbon fibers are randomly placed in the shaped products (B1) and (B2).
6. The joined body according to claim 1, wherein the resin of the shaped products (B1) and (B2) is a thermoplastic resin and the thermoplastic resin is contained in a range of 10 parts to 300 parts with reference to 100 parts of carbon fibers on weight ratio.

7. The joined body according to claim 1, wherein at least one of the shaped products (B1) and (B2) has a protrusion (E) on a surface thereof.

8. The joined body according to claim 7, wherein the protrusion (E) is disposed in the penetration portion (D).

9. The joined body according to claim 7, wherein the protrusion (E) includes a same material as the shaped product (B1) or (B2).

10. The joined body according to claim 1, wherein the shaped products (B1) and (B2) are contacted with and fixed to each other by heat welding.

11. A joined body comprising: a joining portion (C) constituted by a shaped product (B1), a composite substrate (A), and a shaped product (B2) which are laminated in this order,
 wherein the composite substrate (A) contains a plurality of multifilaments of an organic material and a thermoplastic resin, and the shaped products (B1) and (B2) each contain carbon fiber and a resin, and
 wherein
 (i) the composite substrate (A) includes: one impregnation portion in which a space between the multifilaments is impregnated with the thermoplastic resin and in which an impregnation rate of the thermoplastic resin in the space between the multifilaments is in a range of 90% to 100% and another impregnation portion in which an inside of a multifilament is impregnated with the thermoplastic resin and in which an impregnation rate in the inside of the multifilament is in a range of 0 to 50%,
 (ii) the composite substrate (A) has a through hole (D1) which penetrates the composite substrate (A) in a thickness direction,
 (iii) the shaped products (B1) and (B2) are fixed by heat welding through the through hole (D1) of the composite substrate (A),
 (iv) the multifilaments are twisted fiber cords in which two primary twisted fibers are piled and a final twist is piled plied to the two primary twisted fibers, and
 (v) at least one of the shaped products (B1) and (B2) has a protrusion (E) on a surface thereof, and the protrusion (E) is disposed in the through hole (D1).

\* \* \* \* \*